US009060275B2

(12) United States Patent
Cazanas et al.

(10) Patent No.: US 9,060,275 B2
(45) Date of Patent: Jun. 16, 2015

(54) INTERFACE FOR SYNCHRONIZING AUTOMATED REPLIES BETWEEN DIFFERENT MESSAGING SYSTEMS

(71) Applicant: Cellco Partnership, Basking Ridge, NJ (US)

(72) Inventors: Carlos A. Cazanas, Bethlehem, PA (US); Azam Khan, Franklin, NJ (US); Victor M. Pagan, Breinigsville, PA (US)

(73) Assignee: Cellco Partnership, Basking Ridge, NJ (US)

( * ) Notice: Subject to any disclaimer, the term of this patent is extended or adjusted under 35 U.S.C. 154(b) by 368 days.

(21) Appl. No.: 13/648,017

(22) Filed: Oct. 9, 2012

(65) Prior Publication Data

US 2014/0099922 A1 Apr. 10, 2014

(51) Int. Cl.
*H04W 12/06* (2009.01)
*H04L 29/08* (2006.01)

(52) U.S. Cl.
CPC ............... *H04W 12/06* (2013.01); *H04L 67/20* (2013.01); *H04L 67/2819* (2013.01)

(58) Field of Classification Search
CPC ..... H04W 84/005; H04W 84/06; H04W 4/14; H04W 76/02; H04W 88/06; H04W 24/00; H04W 28/04; H04W 28/18; H04W 4/02; H04W 52/0235; H04W 76/025; H04W 88/14; H04W 8/22; H04W 8/245; H04W 28/20
See application file for complete search history.

(56) References Cited

U.S. PATENT DOCUMENTS

| | | | | |
|---|---|---|---|---|
| 6,792,085 | B1 * | 9/2004 | Rigaldies et al. | 379/88.13 |
| 7,450,574 | B1 * | 11/2008 | Miller et al. | 370/356 |
| 8,032,122 | B2 * | 10/2011 | Sigmund et al. | 455/413 |
| 8,412,817 | B1 * | 4/2013 | Bharathula | 709/224 |
| 2003/0021393 | A1 * | 1/2003 | Caharel et al. | 379/67.1 |
| 2006/0025114 | A1 * | 2/2006 | Bales et al. | 455/413 |
| 2006/0294208 | A1 * | 12/2006 | Adams et al. | 709/220 |
| 2008/0127231 | A1 * | 5/2008 | Shaffer et al. | 719/328 |
| 2008/0159492 | A1 * | 7/2008 | Moore | 379/88.22 |
| 2008/0178300 | A1 * | 7/2008 | Brown et al. | 726/29 |
| 2009/0061827 | A1 * | 3/2009 | Bulgin et al. | 455/413 |
| 2009/0203403 | A1 * | 8/2009 | Gidron et al. | 455/557 |
| 2010/0111270 | A1 * | 5/2010 | Langos | 379/88.14 |
| 2010/0158211 | A1 * | 6/2010 | Chatterjee et al. | 379/88.12 |
| 2011/0269424 | A1 * | 11/2011 | Multer et al. | 455/411 |
| 2014/0057610 | A1 * | 2/2014 | Olincy et al. | 455/414.1 |

* cited by examiner

*Primary Examiner* — Mehmood B Khan

(57) ABSTRACT

Systems and techniques are provided for synchronizing automated reply configuration settings between different messaging services for an individual user of a mobile device. User account information and an authentication key are registered at a server of a first messaging service associated with the mobile device and a second messaging service associated with a client of the second messaging service. In response to a request for access to an automated reply function of the first messaging service from the client of the second messaging service, it is determined whether or not the client is authorized for access based on a comparison of authentication information included in the client's request with the authentication key registered for the mobile device. If the client is authorized successfully, the client is allowed to access the automated reply function in accordance with configuration information specified in the request from the client.

18 Claims, 8 Drawing Sheets

INTERFACE FOR SYNCHRONIZING AUTOMATED REPLIES BETWEEN DIFFERENT MESSAGING SYSTEMS

BACKGROUND

In recent years, mobile communication services have expanded and increased in popularity around the world. Many operators of modern mobile communication networks offer their users or subscribers advanced data communication services in addition to the standard wireless mobile communication service for voice calls and mobile messaging services (e.g., text and/or multimedia). Such advanced data services may include, for example, voicemail services enabling the user to record an automated greeting for callers when the user is unable to answer incoming calls directed to the user's mobile device and later, play each caller's recorded voice message. Additionally, such advanced data services may be provided through, for example, a client application program executable at the user's mobile device. The client application program may be provided by the mobile communication network operator via, for example, a virtual store of mobile applications, which the user may select for download and installation to the user's mobile device. For example, the client application program may be an electronic mail (or "e-mail") application that enables the user to receive copies of e-mail messages associated with one or more e-mail accounts of the user.

However, there is generally very little integration between the data services provided to a user by a mobile communication network operator based on a wireless service account of the user and other data services or functionality provided by other communication service providers based on other communication service accounts of the user. For example, voicemail services may be associated with a wireless service account of the user and may be provided by the wireless carrier or operator of the mobile communication network, whereas e-mail services may be associated with an e-mail account and may be provided by a third-party enterprise that is separate from the wireless carrier and mobile communication network. Further, there may be little or no integration between different client application programs on different computing platforms or devices of the user (e.g., voicemail application at user's mobile device vs. e-mail application at user's desktop or personal computer).

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
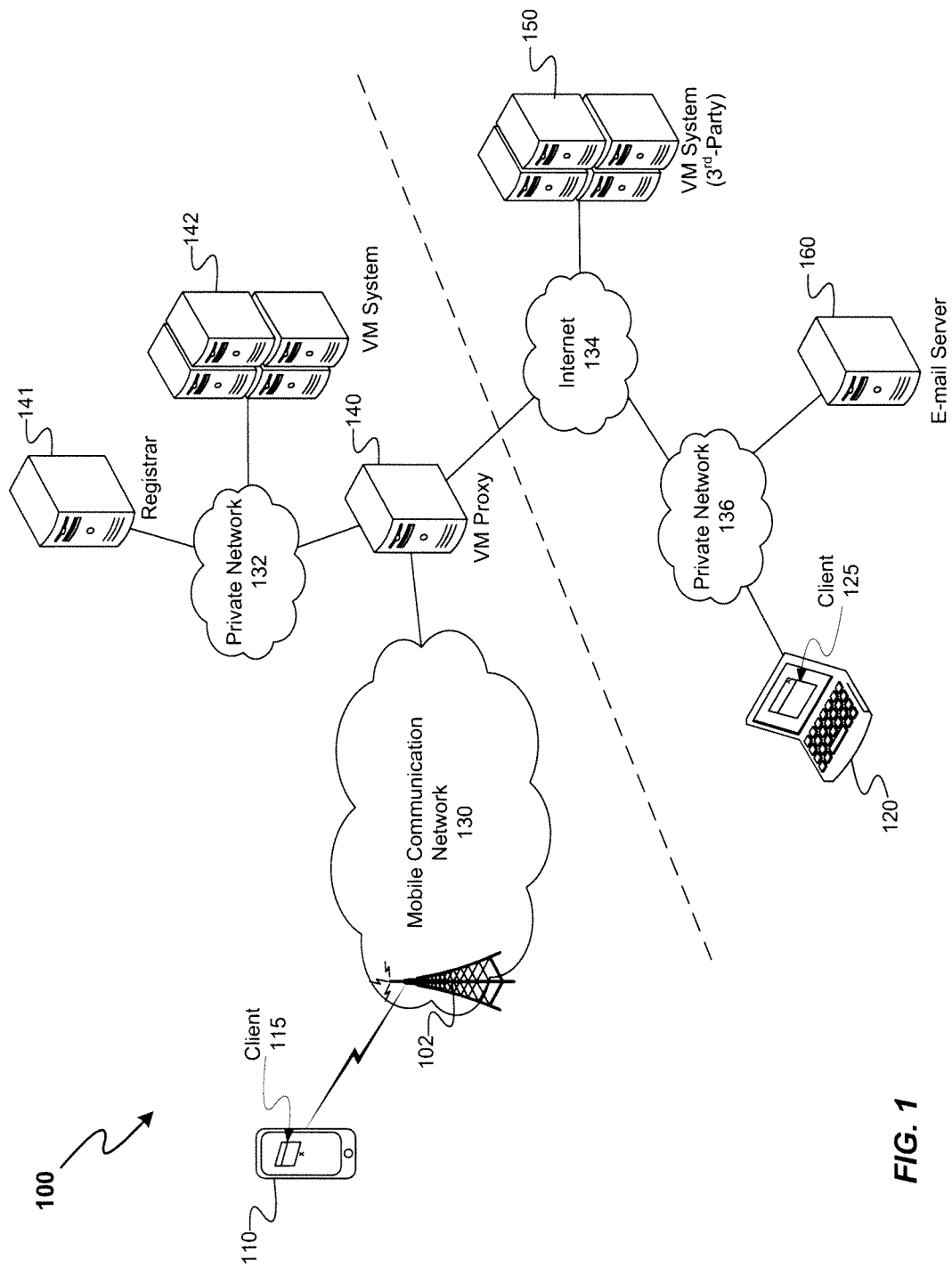
FIG. 1 illustrates an exemplary network environment for providing a variety of communication services, including communications for synchronizing automated reply settings between different communication systems in the network environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The systems and techniques disclosed herein enable a user to configure automated reply settings for multiple messaging systems in a communication network environment using a single interface provided at a computing device of the user. In some implementations, the interface may be provided via a client application executable at a desktop or personal computing device of the user or a mobile client application executable at a mobile device (e.g., mobile handset, cellular phone, a tablet computer or the like) of the user. Further, both client applications may be preconfigured by the user so as to synchronize different user-specified options or settings for automated reply messages or notifications across different communication systems related to different messaging services.

In an example, the interface is provided via an electronic mail (or "e-mail") client application (or plug-in module of the e-mail client) executable at the user's desktop or personal computing device. However, it is noted that a similar interface may be provided via a mobile client application executable at the user's mobile device. In this example, the automated reply messages may be automated out-of-office reply messages, including for e-mail and voice messages, sent or returned by the e-mail and voicemail communication systems, respectively. The automated out-of-office messages may be enabled by the user through, for example, a user option associated with an out-of-office assistant feature of the desktop (or mobile) e-mail client application. The automated reply messages sent/played by the voicemail system may be associated with a subscriber account of the user for cellular, wireless or mobile communication services provided to the user's mobile device by a wireless carrier or operator of a mobile communications network. Further, this mobile communication service provider may be a separate entity from the service provider for e-mail communication services associated with an e-mail account of the user.

In some implementations, the user may configure personalized options for an automated out-of-office reply feature for both incoming emails received at the e-mail messaging system and phone calls delivered to the cellular voicemail system via an interface of an e-mail client executable at the user's desktop computing device. For example, the user may use the interface to enable default or personalized e-mail messages that are automatically sent in response to inbound e-mail messages directed to an e-mail account of the user and received at an e-mail exchange server associated with the e-mail account. Additionally, the user may use the same interface to enable default or personalized recordings automatically delivered or played in response to inbound voice calls directed to a mobile device of the user and received at the voicemail messaging system associated with a mobile account of the user for mobile communication services.

While the example provided herein may be described in the context of voicemail systems for mobile communication services and mobile devices, it is noted that the subject technology is not intended to be limited thereto. Thus, the subject technology may be applied to voicemail systems associated with "landline" telephone services including, for example, Voice-over Internet Protocol (VoIP) services that enable users to use a personal computer or similar computing device to make and receive phone calls over Internet Protocol (IP) networks including the Internet or similar networks. Also, while the examples provided herein may be described in the context of automated out-of-office reply messaging systems (e.g., an "out-of-office assistant") of e-mail client applications executable at, for example, a desktop computing device of the user, it should be noted that the techniques described herein are not intended to be limited thereto.

Further, while the examples described herein relate to e-mail and voicemail communication systems, it is noted that the subject technology may be used for synchronizing automated reply settings between any user-selectable combination of various communication systems. Examples of such communication systems providing different messaging services to the user may include, but are not limited to, e-mail systems (e.g., including one or more e-mail exchange servers), messaging systems for short messaging service (SMS), enhanced message service (EMS) messages and multimedia message service (MMS), and a voicemail system for voicemail messages (e.g., including one or more voicemail systems associated with one or more phones/lines of a user or subscriber). Hence, the techniques described herein may be applied to other types of message notification systems that may be automated for other types of application programs executable at different types of computing platforms or devices of the user.

The detailed description below uses a number of terms with respect to various system components and operations. Although generally known, use of several of these terms may not be strictly standardized in the art. For the convenience of the reader, the following definitions for some of the relevant terms are presented, as used by way of example in the detailed description below.

The terms "client" and "client application" are used interchangeably herein to refer broadly and inclusively to any program or process configured to consume a functionality offered by an application server (or simply, "server"). For example, a client executing at a computing device of a user may communicate over a communication network to utilize a function of a web application or service hosted at the server. Such a client may be executed at any type of computing device including, for example and without limitation, a desktop computer or workstation, a mobile device, or a host or network device that may operate at other times as a server to other clients. Further, a client can be any type of remote or local process with respect to the computing device executing or hosting the service. Also, a client can be another service.

Similarly, a "server" may be any type of computing device capable of communicating data to one or more clients over the communication network. A server includes, for example, a data communication interface for packet data communication and a central processing unit (CPU), in the form of one or more processors, for executing program instructions. The server platform typically includes an internal communication bus, program storage and data storage for various data files to be processed and/or communicated by the server, although the server often receives programming and data via network communications. The server or server functions may be implemented using, for example, a clustered computing system or server farm in a distributed environment across a number of computing devices having similar platforms (e.g., operating system and other programming). The communication network can include, but is not limited to, the Internet or World Wide Web. The client device and server may use a number of different technologies and communication protocols for transmitting messages or data across the network. Examples of such technologies may include, but are not limited to, Hyper-Text Transfer Protocol (HTTP), Simple Object Access Protocol (SOAP), Service Oriented Architecture, Web 2.0 application features and Lightweight Directory Access Protocol (LDAP). Further, messages transmitted across the network may be formatted using any of various markup, scripting or other programming languages including, for example and without limitation, Hyper-Text Markup Language (HTML), extensible markup language (XML) and JavaScript. With respect to a client accessing the functionality provided by the server, the term "authentication" may be used herein to refer generally to the function of verifying the identity of the particular client for purposes of allowing access to the functionality provided by the application server.

Reference now is made in detail to the examples illustrated in the accompanying drawings and discussed below. An exemplary communication network environment is described initially with respect to FIG. 1. The network environment provides a variety of communication services between different clients and servers, including communications for configuring automated out-of-office (or other personalized) replies for multiple computing platforms or devices simultaneously based on options provided by a user via an interface at a computing device of the user. Following the description of the network environment, network processes related to the interaction between the various elements or systems within the network environment are described with respect to FIGS. 2-5.

FIG. 1 illustrates a functional block diagram of an exemplary wireless network environment 100 for providing mobile voice telephone services and various data services across different communication networks. In the example illustrated in FIG. 1, network environment 100 includes a mobile communication network 130 that facilitates communications between a mobile device 110 and various other devices and systems including, but not limited to, a computing device 120, via different types of networks including, but not limited to, a private network 132, the Internet 134, and a private network 136, as will be described in further detail below. As shown in FIG. 1, private network 132 is associated with the wireless carrier providing data communication services to mobile device 110. Network 132 may be implemented as a local area network, medium area network, and/or wide area network. Similarly, private network 136 may be a private local, medium-area or wide-area network of, for example, an enterprise or business organization providing various services, including e-mail exchange services for an e-mail account of the user, to computing device 120.

Mobile device 110 can be any type of mobile telecommunication device with at least one processor, a memory, a display and one or more user input devices (e.g., a touchscreen display, microphone, QWERTY keyboard or T9 keypad). Examples of such mobile telecommunication devices include, but are not limited to, portable handsets, smartphones, tablet computers and personal digital assistants. Computing device 120 can be any type of personal computing, desktop or workstation device having at least one processor, a network communication interface, a memory, a display, and one or more user input devices (e.g., a mouse, keyboard, etc.).

In this example, mobile device 110 and computing device 120 are associated with the same user. For example, third-party private network 136 may be associated with an enterprise organization or employer of the user, and thus, computing device 120 may be the user's office workstation computer that executes e-mail client associated with an office or work e-mail account of the user. Further, mobile device 110 may be a personal (or employer-issued) mobile device that the user can use to retrieve personal and/or work-related e-mail messages via, for example, an interface or mobile e-mail client application executable at mobile device 110. In some implementations, mobile device 110 is configured to execute a client application (or "client") 115 and computing device 120 is configured to execute a client 125. As will be described in further detail below, clients 115 and 125 each may be configured to provide an interface enabling an individual user associated with both devices to synchronize automated out-of-office settings, including default and personalized settings, for different types of messaging service accounts of the user (e.g., an e-mail account and a wireless service account for voicemail and instant messaging services for sending/receiving text or multimedia content).

While the example in FIG. 1 shows only mobile device 110, network environment 100 can be used to facilitate voice and/or data communications for additional computing devices (not shown) over communication network 130. Furthermore, the subject technology described herein may be implemented in communication network 130 using any of a variety of available communication networks and/or on any type of computing device compatible with such a network. As such, FIG. 1 is used herein to provide only a very simplified example of a few relevant elements of network environment 100 and network 130, for purposes of discussion and explanation.

Also, for purposes of discussion, mobile communication network 130 will be described in the context of a network supporting both CDMA and 3rd Generation Partnership Project (3GPP) network technologies including, for example and without limitation, 3GPP type 2 (or 3GPP2) and 3GPP Long Term Evolution (LTE, at times also referred to as 4G). As described above, network 130 may use separate communication channels and radio access networks for communicating voice and data, respectively, to mobile device 110. In an example, the radio access network for data communications is a 3G or 4G data network using 3GPP or 4G LTE technology and the radio access network for voice calls is a CDMA network. Although not shown in FIG. 1, mobile communication network 130 may include various systems and components for supporting 3G and 4G network data traffic, including an Internet Protocol (IP) Multimedia Subsystem (IMS) for network data traffic using IP and/or other network communication protocols. However, it should be noted that the present techniques are not intended to be limited thereto and may be implemented using other types of mobile communication network technologies that do not provide simultaneous voice and data communications for mobile devices, as described above.

Mobile communication network 130 provides communications between mobile device 110 and other mobile devices on mobile communication network 130 as well as other devices outside of mobile communication network 130 (e.g., devices on third-party mobile communication networks operated by a different wireless carrier). An inter-carrier or other intermediate network gateway may provide communication connectivity between mobile communication network 130 and other networks. Mobile communication network 130 allows a user of mobile device 110 to initiate and receive telephone calls to and from other mobile device users as well as users of traditional "landline" telephones connected through a public switched telephone network (PSTN).

In some implementations, mobile communication network 130 includes a number of interconnected access networks for providing voice and data communication services to mobile device subscribers/users. Hence, the overall network 130 may include a number of radio access networks (RANs), as well as regional ground networks interconnecting a number of RANs and a wide area network (WAN) interconnecting the regional ground networks to core network elements. A regional portion of network 130, such as that serving mobile device 110 will typically include one or more RANs and a regional circuit and/or packet switched network and associated signaling network facilities. Physical elements of a RAN are generally operated by a mobile network operator or wireless carrier of mobile communication network 130. Such physical elements include a number of base stations, as represented in the example shown in FIG. 1 by a base station (BS) 102.

In an example, mobile communication network 130 offers a variety of communication services including both voice and data services to different user devices. Examples of different data services that may be offered by mobile communication network 130 include, but are not limited to, over-the-air downloads, web browsing, e-mail and other messaging services. In addition, mobile communication network 130 may offer voicemail and other voice services via various server systems including, but not limited to, a voicemail (VM) proxy server system (or "VM proxy") 140, a registration server system (or "registrar") 141, a VM system 142 and other servers or systems associated with mobile communication network 130. Examples of such voice services may include, but are not limited to, call answering, caller greeting playback and message recording. Further, mobile communication network 130 may provide some "traditional" voice services (e.g., traditionally provided through a voice subsystem of network 130) as data services (e.g., through a data network subsystem). For example, mobile communication network 130 may provide a visual voicemail service as a data service including message download and playback functionality involving data communications via a graphical user interface (GUI) at mobile device 110. In addition, mobile communication network 130 facilitates communications for one or more services via the Internet 134, including communications with a third-party VM system 150. VM system 150 in this example is associated with another mobile communication network (not shown) operated by a different wireless carrier. Mobile communication network 130 also facilitates communications between server systems 140-142 and desktop or workstation device 120 an e-mail server 160 or other server(s) associated with a third-party private network 136.

Further, VM proxy 140 is an application server system including a database or local data store communicatively coupled to a registrar 141 and a VM system 142 via another network 132. Also, network 130 is operated by a wireless carrier or mobile communication services provider and network 132 is a private network of the wireless carrier. VM proxy 140 is configured to communicate with registrar 141 and VM system 142 (via network 132) based on one or more requests received from devices 110 and 120 (e.g., via network 130 or the Internet 134), as will be described in further detail below. Accordingly, VM proxy 140 functions as a communication interface between mobile device 110 via mobile communication network 130 and registrar 141 and VM system 142 via private network 132. In a further example, VM proxy 140 also functions as a communication interface between the private network 132 and devices/systems connected thereto (registrar 141 and VM system 142) and computing device 120, e-mail server 160 and third-party VM system 150 via Internet 134. In this example, third-party VM system 150 is associated with a different mobile communications network of another wireless carrier or operator. For example, third-party VM system 150 may be associated with a third-party VM service provider that provides VM services for a different VM account of the same user.

In some implementations, VM proxy 140 is configured to authenticate or validate the credentials of devices 110 and 120 or other devices (not shown) to ensure that the functionality offered by VM proxy 140 is available only to authorized devices (client applications executing at the respective devices). As such, devices 110 and 120 may be authenticated by VM proxy 140 initially, upon establishing a data connection, in order to verify the client's identity, based on the client-specific information associated with the respective communication request messages from each of devices 110 and 120. In an example, VM proxy 140 is communicatively coupled to one or more separate physical servers (not shown) including, but not limited to, one or more authentication server(s) as well as one or more database server(s) via network 132. Alternatively, the authentication or client validation process may be implemented as an internal authentication program module executable at VM proxy 140.

As described above, mobile device 110 and computing device 120 are both associated with the same user who, for example, may use each device for different purposes or accessing services from different service providers. In an example, mobile device 110 is associated with a wireless service account of a user/subscriber for mobile communication services provided by a wireless carrier or operator of communication network 130. The services provided by the wireless carrier generally include advanced data services for various applications executable at different users' respective mobile devices. Such an application may include, but is not limited to, an e-mail application for retrieving e-mail messages associated with an e-mail account of the user. Additional services provided by the carrier generally include voicemail services allowing callers to leave voice messages for the user/subscriber, for example, when mobile device 110 is unavailable to communication network 130 (e.g., powered off or out of signal range) as well as instant messaging services for sending text messages using SMS and/or messages including image or other multimedia content using MMS.

In an example, an interface may be provided at each of client applications 115 and 125 for enabling the user to configure automatic out-of-office reply notification messages to be sent in response to inbound e-mail messages directed to an e-mail service account of the user. Alternatively, client 115 may be a standalone mobile application that includes an interface for synchronizing user-configured options for automated (e.g., out-of-office) reply messages with e-mail client 125 via mobile communication network 130 and that may be configured to communicate with a separate e-mail client application also executable at mobile device 110. In this way, user-configured options for automated (e.g., out-of-office) reply messages from an e-mail client application associated with an e-mail account of the user may be used to configure automated reply messages from a voicemail service associated with a voicemail or wireless service account of the user. The capability to configure such options for automated reply messages and also, enable automated reply messages using a single interface (e.g., at e-mail client 115 or 125) can increase efficiency and save time for the user.

The e-mail service for the user's e-mail account in this example may be hosted at an e-mail exchange server 160. Accordingly, client 115 and client 125 (or "e-mail client 125") may be configured to communicate with e-mail server 160 to retrieve or request e-mail messages associated with the user's e-mail account via communication network 130 and one or more other interconnected networks (e.g., networks 130, 132, 136 and Internet 134), as shown in FIG. 1. As shown in FIG. 1, device 120 and e-mail client 125 may communicate with e-mail server 160 via network 136. Additionally, the user may use the same interface to enable default or personalized audio messages or recordings to be automatically delivered or played to callers in response to inbound voice calls directed to mobile device 110 and received at VM system 142.

In some implementations, an interface for synchronizing automated reply settings between different messaging systems (e.g., e-mail server 160 and VM system 142) in network environment 100 may be implemented as a plug-in module of client 125. A similar interface may be implemented for client 115. Client 115 and/or the "plug-in" for e-mail client 125 may be downloaded to mobile device 110 and/or computing device 120, respectively, via Internet 134 from an application store or virtual storefront including an online catalog of various applications targeting one or more computing platforms/devices. The application store may be provided by, for example, the operator of communication network 130 (or "wireless carrier").

Figure 2:
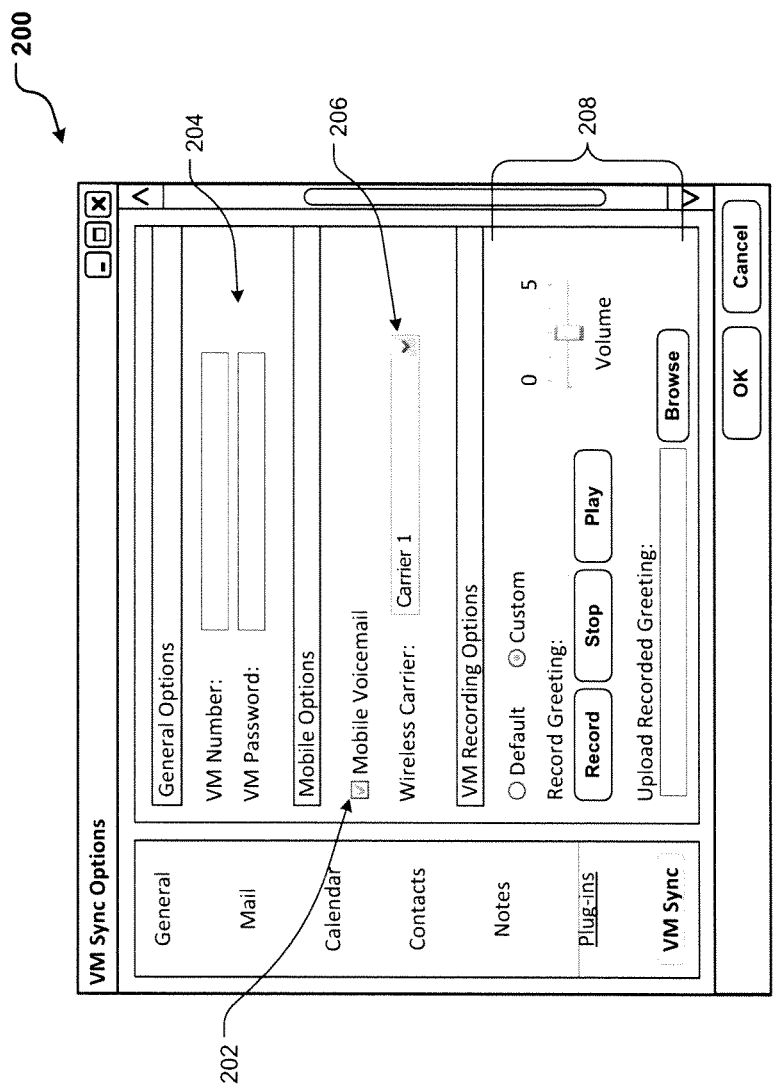
FIG. 2 shows an example user interface of an exemplary plug-in preference panel of an e-mail client for configuring and synchronizing automated reply settings for a voicemail account from the e-mail client.

In particular, the plug-in for e-mail client 125 may be delivered to the user's desktop computer (e.g., computing device 120) as part of an installer executable file, which the user can launch for installing the plug-in as a module of e-mail client 125 already installed on the desktop computer. In some implementations, the installed plug-in module provides a user interface integrated with the existing user interface of e-mail client 125. For example, the plug-in may be implemented as a new preference or settings panel in addition to other settings panels of e-mail client 125, as shown in the example of FIG. 2, as will be described in further detail below. Such a preference panel may be similar in appearance to the existing or default user preference panels for configuring various other settings of the e-mail client and provided to the user in a separate window of the e-mail client. Also, like the default or existing settings panels of e-mail client 125, the new plug-in preference panel may be accessible to the user via a menu option within e-mail client 125.

In some implementations, the installed plug-in of client 125 may provide user options for configuring client 125 with authentication and authorization information related to the user's wireless service account associated with mobile device 110. As will be described in further detail below in reference to FIG. 3, e-mail client 125 and mobile device 110 (or mobile client 115 at device 110) communicate with each other and with VM proxy 140 as part of a registration process for registering relevant authentication/identification and authorization information related to the user's e-mail account and wireless service and voicemail account. This information may be sent, for example, in the form of an authorization vector data structure or parameter list. The registered information at VM proxy 140 allows automated "out-of-office" messages or recording to be played for inbound voice calls directed to mobile device 110, when out-of-office system (or "out-of-office assistant") of e-mail client 125 is engaged (e.g., based on user input at device 120).

In an example using the plug-in for e-mail client 125, the enhanced client offers a user option to configure e-mail client 125 to receive registration information, including authorization information for the e-mail and wireless service (or voicemail) accounts of the user, from mobile device 110 (e.g., via client 115). Such an option may be displayed in the above-described plug-in preference panel interface of e-mail client 125, for example, as a toggle control element of the interface, e.g., as a checkbox or radio button control of the preference panel.

FIG. 2 shows an example user interface of a plug-in preference panel 200 including different user options for configuring automated reply settings for a voicemail (VM) service account of the user from e-mail client 125. As shown in FIG. 2, the plug-in preference panel 200 in this example includes various user interface controls enabling the user to input additional configuration settings. Such configuration information includes, for example and without limitation, a mobile device number (MDN) or other unique device identifier associated with mobile device 110, the user's voicemail account information and information identifying the wireless carrier associated with the user's wireless service or voicemail account and mobile device 110. Thus, in addition to a control element 202 (e.g., checkbox or radio button) for enabling/disabling registration process, preference panel 200 includes additional user interface controls including, for example and without limitation, text fields 204 for entering MDN and other relevant account information (e.g., voicemail account password) and a drop-down menu 206 with preconfigured list of supported wireless carriers.

Also, as shown by the example interface of plug-in panel 200, a set of recording options 208 may be provided for the user to specify a default or custom voicemail greeting to be played for callers. As shown in FIG. 2, recording options 208 may include, for example, user controls to record one or more custom audio reply messages or greetings. Additionally or alternatively, the interface may enable the user to provide a location of a digital audio file of a previously recorded audio message. The audio file may be stored either locally at the user's computing device (e.g., device 120) or at a remote network location. While not shown in FIG. 2, plug-in preference panel 200 may include additional settings options that the user can use to specify additional configuration information for e-mail client 125. Examples of such additional settings options may include, but are not limited to, an authentication key or secret hash password associated with the user's mobile device (e.g., mobile device 110 of FIG. 1) as well as the name or network location address of the dynamic name server (DNS) or fully qualified domain name (FQDN) of VM proxy 140. Alternatively, information related to VM proxy 140 may be preconfigured in the interface and may be based on, for example, the wireless carrier selected by the user via the aforementioned list of supported wireless carriers in menu 206.

In some implementations, the registered e-mail account and MDN of mobile device 110 associated with the user in VM proxy 140 is used (e.g., by the virtual application store or marketplace of the selected carrier) to automatically provide software updates related to the plug-in of e-mail client 125 or client 115, or notifications of such updates (e.g., via e-mail), to computing device 120 and/or mobile device 110. Once the registration process, described in further detail below with respect to FIG. 2, has completed successfully, the registration option of the plug-in interface of client 125 is automatically reset or disabled and the corresponding toggle option displayed in the plug-in preference panel of e-mail client 125 is unchecked or deselected. Thus, this option would need to be selected again (e.g., by the user via the plug-in interface) to initiate a new registration process so as to reconfigure the plug-in and e-mail client 125 for any further events related to any new information that needs to be registered with VM proxy 140. For example, a new registration process is initiated to register new information or to register changes to the information previously registered with VM proxy 140 (e.g., if the user changes to a new or different mobile device, mobile device number or e-mail account).

In addition to the above-described plug-in user interface provided for e-mail client 125 of personal computing device 120, client 115 is used to provide an interface for the user to configure automated out-of-office reply settings at mobile device 110. As described above, client 115 is a mobile client application program executable at mobile device 110. Similar to the above-described plug-in for e-mail client 125, client 115 may be downloaded via communications network 130 (and Internet 134) from an online or virtual store for mobile applications. In an example, client 115 is a mobile e-mail client application that is configured to communicate with VM proxy 140 for registering authentication and authorization information, as described above. In this example, client 115 communicates directly with e-mail server 160 or other e-mail exchange server to retrieve e-mail messages sent by other users to the user's e-mail account or send e-mail messages to other users via e-mail server 160. Thus, client 115 in this example is used in place of a default e-mail client application program previously installed at mobile device 110 (e.g., by the device manufacturer or mobile operating system provider). Additionally or alternatively, client 115 may be implemented as a plug-in for the default e-mail client program of device 110, similar to the desktop e-mail client plug-in, as described above.

In a different example, client 115 is a standalone application executable at mobile device 110 that is configured to communication with a separate or default mobile e-mail client of mobile device 110 or with e-mail client 125 at computing device 120 via communication network 130. In this example, the client 115 is implemented as a background process or service that communicates with the default e-mail client via an application or other functional layer of a mobile operating system of mobile device 110. In a further example, client 115 is used to provide the automated reply message functionality as described herein at mobile device 110, e.g., whether or not it is executable in parallel with the default e-mail client program.

Figure 3:
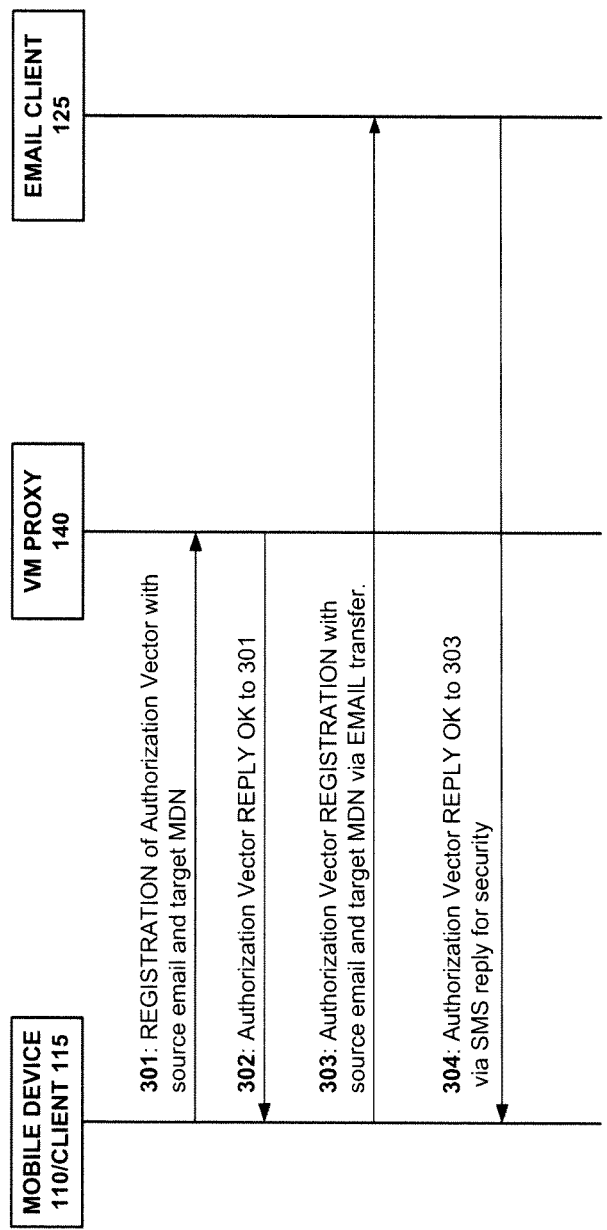
FIG. 3 is a flowchart of an exemplary process for registering authorization information associated with a mobile device and an e-mail client of the user with a voicemail proxy in the network environment of FIG. 1, so as to enable synchronization of automated reply settings for e-mail and voicemail communication services.

FIG. 3 is a flowchart of an exemplary process 300 for registering authorization information associated with a mobile device and an e-mail client of the user so as to enable synchronization of automated reply settings for e-mail and voicemail communication services associated with respective e-mail and voicemail accounts of the user. By way of example, process 300 will be described using the component systems/devices of networking environment 100 of FIG. 1, as described above. Thus, in the example shown in FIG. 3, the steps of process 300 implement the above-described registration process for registering relevant authentication and authorization information related to mobile device 110 (or client 115) and e-mail client 125 with VM proxy 140 of networking environment 100 of FIG. 1, as described above. Thus, while process 300 is described using mobile device 110, e-mail client 125 and VM proxy 140, it should be noted that process 300 is not intended to be limited thereto and that process 300 may be used with devices and systems of different networking environments.

As shown in FIG. 3, process 300 begins at step 301, in which a registration request including authorization information in the form of one or more authorization vectors including user account identifiers and authorization information for e-mail and voicemail messaging accounts associated with the user at mobile device 110. In the example of FIG. 3, the user account information for these respective messaging services include an e-mail address of the user and a target MDN associated with the user and mobile device 110. The MDN is a unique number assigned to mobile device 110 by the wireless carrier or operator of mobile communication network 130. The MDN is used as a unique identifier by the wireless carrier to provide various communication services, including the automated "out-of-office" reply e-mail and voicemail synchronization service described herein, for the user via mobile device 110.

In some implementations, mobile device 110 is configured to simultaneously send the MDN and e-mail address as part of an authorization vector to VM proxy 140, based on input from the user via client 115, as described above. In an example, the e-mail address and MDN are provided by the user via an interface of client 115 at mobile device 110. In a different example, client 115 is configured to automatically retrieve the MDN and e-mail address from device configuration settings previously stored at the mobile device MDN. For example, the e-mail address may be retrieved from e-mail account settings previously stored at an internal memory of mobile device 110 for a separate e-mail client application executable at mobile device 110. If mobile device 110 has multiple e-mail accounts or e-mail clients, client 115 provides the user with an option to specify a default account and/or e-mail client or select one from a list provided via an interface of client 115. The e-mail address provided by the user in this example may be associated with an e-mail account and services provided by e-mail server 160 and generally accessible to the user through e-mail client 125. As such, the same user may retrieve e-mail messages associated with this account via e-mail client 125 executable at computing device 120.

The authorization vector information sent with the e-mail address and MDN from mobile device 110 to VM proxy 140 may include, for example and without limitation, username and password information used to authenticate the user for e-mail and voicemail messaging services, respectively. Alternatively, this information may be provided by e-mail client 125 based on input from the user via the plug-in interface module installed at e-mail client 125, as described above. Further, the authorization vector includes an authentication key generated by mobile device 110 and used for authentication/authorization purposes when synchronizing automated reply settings between mobile device 110 (or client 115), e-mail client 125 and VM proxy 140. Such an authentication key may be, for example, an encrypted password shared by mobile device 110 (or client 115) with only e-mail client 125 and VM proxy 140 for purposes of verifying or authenticating e-mail client 125 in response to requests from e-mail client 125 received by mobile device 110 and/or VM proxy 140. In some implementations, the authentication key is in the form of a hash key or password generated by client 115 using a hash algorithm. Further, as the hash password/key is shared between only client 115, e-mail client 125 and VM proxy 140, security is improved by mitigating the potential for any unauthorized access.

If the authorization vector information, e-mail address and MDN have been registered successfully with VM proxy 140, an acknowledgement reply indicating successful registration is sent from VM proxy 140 at step 302 to mobile device 110 at step 301. Process 300 then proceeds to step 303, which includes registering the authorization vector information, e-mail address and MDN with e-mail client 125. If this information is registered successfully, an acknowledgement reply indicating successful registration is sent in step 304 from e-mail client 125 to mobile device 110 (or client 115).

Further, once the authorization vector (including the above-described secret hash password), e-mail account and MDN information is registered successfully at VM proxy 140 and e-mail client 125, automated message settings for both e-mail and voicemail messaging services associated with mobile device 110 can be synchronized between e-mail and voicemail messaging systems. This includes synchronizing settings for automated out-of-office reply settings for both default messages and user-customized messages, as will be described in further detail below with respect to FIGS. 4 and 5, respectively. As described previously, the e-mail plug-in or interface module of e-mail client 125 is configured to communicate with a voicemail system (e.g., VM system 142 or third-party VM system 150 of FIG. 1) so as to enable an automated "out-of-office" message or recording to be played for inbound callers in response to inbound calls made by these callers to a mobile device (e.g., mobile device 110 of FIG. 1) of the user. Furthermore, the automated audio reply is activated automatically when the user enables an out-of-office option (or "out-of-office assistant") of e-mail client 125 executable at the user's desktop computing device (e.g., computing device 120 of FIG. 1).

Figure 4:
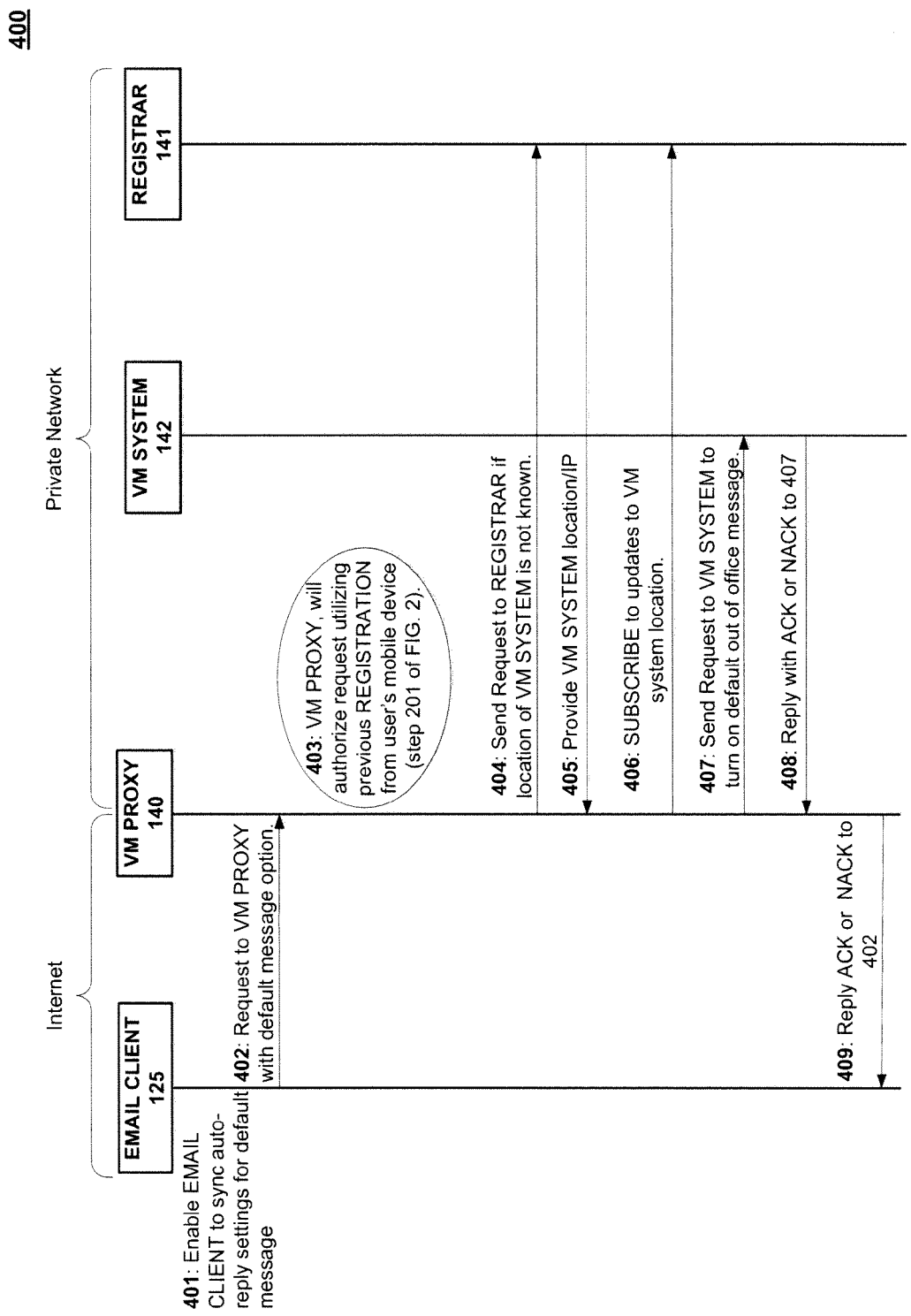
FIG. 4 is a flowchart of an exemplary process for synchronizing default automated reply settings between the e-mail client and voicemail proxy of FIG. 2.

FIG. 4 is a flowchart of an exemplary process 400 for synchronizing settings for default automated reply messages between e-mail client 125 and VM proxy 140, following successful registration of authorization and account information (e.g., following the steps of process 300 of FIG. 3, as described above). Like process 300 of FIG. 3, described above, process 400 will be described using the component systems/devices of networking environment 100 of FIG. 1, as described above. However, process 400 is not intended to be limited thereto. For example, VM proxy 140, registrar 141 and VM system 142 may be associated with a private network (e.g., private network 132), while e-mail client 125 may be associated with a different private network (e.g., private network 136), as described above with respect to network environment 100 of FIG. 1. As such, VM proxy 140 serves as an interface for communications to and from e-mail client 125 (e.g., via the Internet 134, as shown in FIG. 1 and described above) and VM system 142 and registrar 141 (via private network 132)

As shown in FIG. 4, process 400 begins in step 401, in which the user configures e-mail client 125 to synchronize default message reply settings when an automated reply feature (e.g., "out-of-office assistant") of e-mail client 125 is enabled. While the automated messages in this example are described as out-of-office reply messages, the techniques described herein are not intended to be limited thereto. As will be described in further detail below with respect to FIG. 6, these techniques thus may be applied to any kind of automated message and message settings associated with different messaging services (e.g., EMS, SMS and MMS) for the user. For example, different automated out-of-office responses may be configured for inbound communications directed to a voice or messaging service account of the user based on information related to the identity or location of the calling party or message-sender. This information may be derived from the received inbound communication itself and may include, for example and without limitation, a phone number (or area code), e-mail address or other identifier associated with the particular calling party or sender. In an example, the user may be an enterprise employee who specifies one type of automated response (e.g., message indicating the user is out of the office but will be checking email regularly) for communications (e.g., e-mails or phone calls) determined to be from colleagues or originate from geographic regions corresponding to different office locations, while specifying another type of automated response for communications from private parties or unknown locations (e.g., out-of-office message indicating that the user is unreachable and including an alternate contact for any urgent issues.) As described above, these settings may be configured by the user via the interface of e-mail client 125. Further, such settings are used to configure each messaging service to automatically send messages in response to inbound communications directed to each service. Thus, an automated out-of-office e-mail message is sent in response to inbound e-mails directed an e-mail account hosted at an e-mail exchange server (e.g., e-mail server 160 of FIG. 1), as described above.

Also, as described above, the user may use the interface of e-mail client 125 to configure settings to be applied to an automated recording (or greeting) played for callers for inbound voice calls directed to the MDN associated with a mobile device of the user (e.g., mobile device 110) and received at a voicemail system (e.g., VM system 142) providing voicemail services for the user at the mobile device. Voicemail services are provided by a wireless carrier or operator of a mobile communications network (e.g., network 130 of FIG. 1, as described above) in addition to various other communication services. Further, the application of out-of-office settings configured for both received emails (e.g., at e-mail server 160) and received voice calls (e.g., at VM system 142) may be enabled simultaneously when the user enables an out-of-office setting within the e-mail client.

In step 402, e-mail client 125 sends a request specifying a default message option (as opposed to a customized message option, as will be described below in reference to FIG. 4) to VM proxy 140. In addition to an indication of the type of message option, the request from e-mail client 125 includes authentication information, for example, the authentication key or secret hash password registered previously for the user's mobile device (e.g., from client 115 of mobile device 110, as described above). As noted previously, the registered authentication key or password is stored in association with the MDN of the mobile device in, for example, a local data store accessible to e-mail client 125. The hash password in this example was received previously from the device. In a different example, the hash password is provided by the user via an interface of e-mail client 125. In some implementations, for increased security, VM proxy 140 may require additional account authorization information (e.g., username and password information for the user's e-mail and voicemail accounts) from e-mail client 125. The account authorization information received from e-mail client 125 is compared with previously registered information stored in association with the MDN of the mobile device.

In step 403, VM proxy 140 authorizes the request by comparing the information received in the request from e-mail client 125 with information stored previously for the user's mobile device (e.g., as previously registered in steps 201-202 of process 200 of FIG. 2, as described above). Additionally, VM proxy 140 determines whether or not the VM system associated with the MDN of the mobile device can be identified or located based on locally stored or cached information available to VM proxy 140 (e.g., as stored in a local database or storage device coupled to VM proxy 140). VM proxy 140 may not have stored information for the appropriate VM system if, for example and without limitation, this is the first time message settings from e-mail client 125 are being synchronized or such information is stored by VM proxy for only a temporary duration according to a predetermined time.

In a case where VM proxy 140 where the VM system is unknown or cannot be identified by VM proxy 140, process 400 proceeds to step 404, in which VM proxy 140 sends a request to registrar 141 for the identity or location of the appropriate VM system. In response to receiving the request, registrar 141 identifies the VM system based on, for example, the MDN of the mobile device, as included in the request from VM proxy 140. VM proxy 140 identifies the MDN by, for example, retrieving previously registered information based on the hash password received in step 402 (e.g., if not provided in the initial request from e-mail client 125 in step 402).

In step 405, registrar 141 provides the requested location, e.g., in the form of an Internet Protocol (IP) address associated with the VM system (VM system 142, in this example). For example, registrar 141 retrieves this location information from a local database storing a mapping between MDNs and corresponding network location or IP addresses associated with VM systems of the same or different wireless carriers. Thus, the location information sent by registrar 141 in step 405 may correspond to a third-party voicemail system (e.g., VM system 150 of FIG. 1) in a mobile communication network of different wireless carrier than that of VM proxy 140. In a further example, registrar 141 communicates with a remote database or data repository via Internet 134 in order to identify the location of the appropriate third-party VM system associated with the MDN.

In step 406, VM proxy 140 subscribes to receive updates to the relevant VM system location information from registrar 141. As VM proxy 140 caches the location information of VM system 142, subscribing to updates helps to ensure the cached information is accurate and up-to-date for future use. Once the network location (e.g., IP address) of VM system 142 is known, VM proxy 140 sends a request to VM system 142 in step 407 so as to enable a default out-of-office message to be played for callers in response to calls received at VM system 142. Such a default message may be, for example, an automated audio message provided by VM system 142.

In step 408, VM system 142 sends a reply message to VM proxy 140 that includes either an acknowledgement (e.g., "ACK") that the default message has been enabled successfully, as requested in step 407, or a failure notification (e.g., a "NACK") due to a system error (e.g., the MDN or voicemail account of the subscriber is not active). VM proxy 140 then sends to e-mail client 125 either an acknowledgement or failure notification in step 409 in reply to the initial request from e-mail client 125 in step 402.

Figure 5:
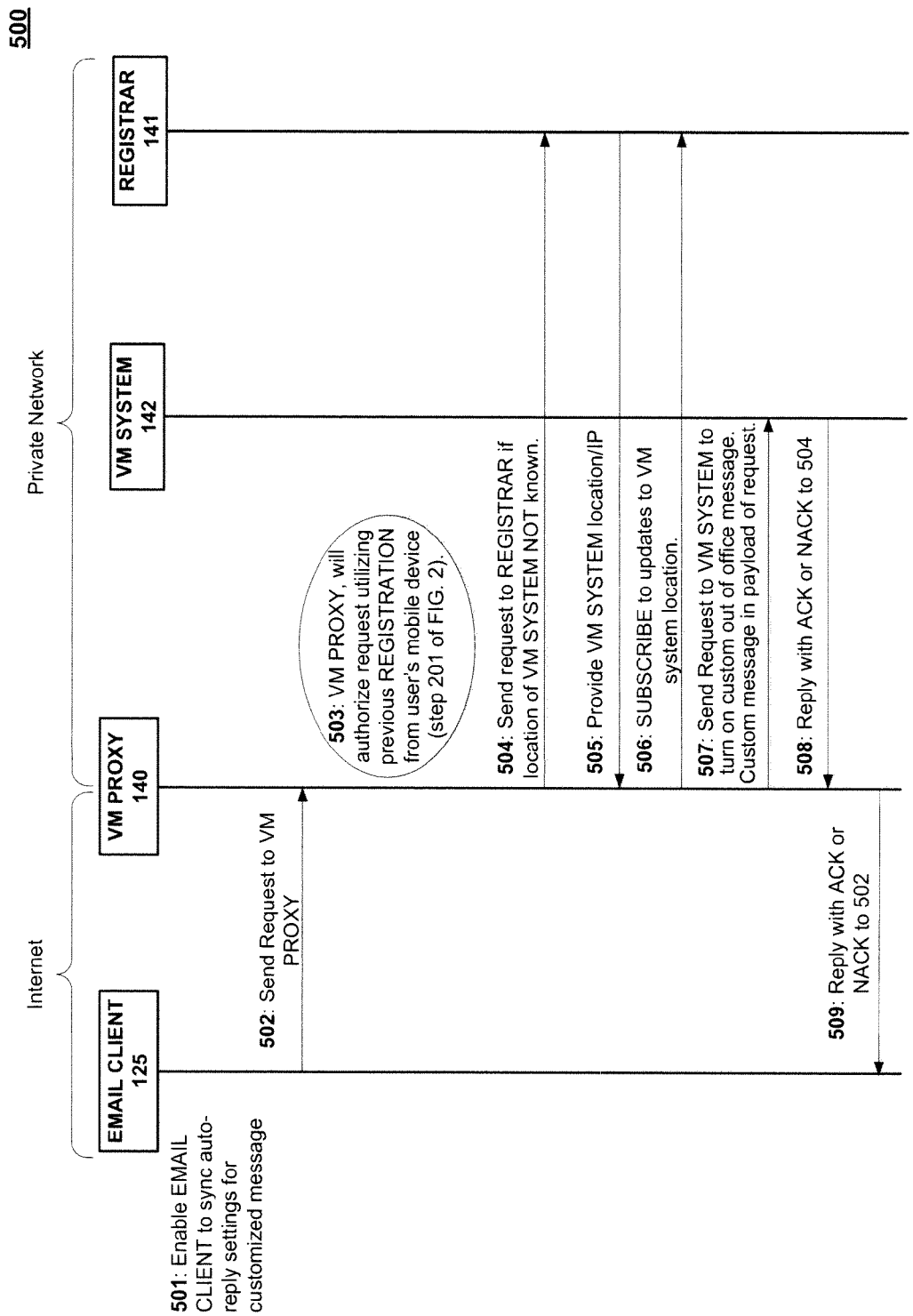
FIG. 5 is a flowchart of an exemplary process for synchronizing custom out-of-office reply message settings between the e-mail client and voicemail proxy of FIG. 2.

In addition to default voice messages, the user may also enable customized audio messages be played by VM system 142 or third-party VM system 150 through e-mail client 125 or plug-in module/interface installed for e-mail client 125. FIG. 5 is a flowchart of an exemplary process 500 for synchronizing settings for user-customized out-of-office reply messages between the e-mail client 125 and voicemail proxy 140, as described above and as shown in FIGS. 1, 3 and 4. Many of the steps of process 500 are similar to that of process 300. However, in addition to enabling the "out-of-office assistant" feature of e-mail client 125 and the automated message setting synchronization service, as described herein, the user in step 501 may provide a custom audio message to be played as the out-of-office reply message played to callers by VM system 142 (or third-party VM system 150) via the installed plug-in of e-mail client 125. As described previously, the plug-in interface may provide an interface for the user to record one or more custom audio messages for this purpose. Additionally or alternatively, the interface may enable the user to provide a location of a digital audio file of a previously recorded audio message. The audio file may be stored either locally at the user's computing device (e.g., device 120) or at a remote network location.

In step 502, e-mail client 125 sends the custom audio message, as provided by the user, to VM proxy 140. For example, the audio message may be included in the payload of the request along with the hash password registered previously for the user's mobile device, as described above. VM proxy 140 authorizes the request in step 503 by comparing the information received in the request from e-mail client 125 with information stored previously for the user's mobile device. Once authorized, VM proxy 140 sends a request in step 504 to registrar 141 for the network location of the appropriate VM system associated with the user's voicemail or wireless service account, based on the MDN associated with the user's mobile device (e.g., as previously registered with VM proxy 140 by client 115, as described above).

In step 505, registrar 141 provides the requested location, e.g., in the form of an Internet Protocol (IP) address associated with the VM system (VM system 142, in this example). As in step 306 of process 300, described above, VM proxy 140 subscribes to receive updates to the relevant VM system location information from registrar 141 in step 506. In step 507, VM proxy 140 uses the network location received in step 506 to send a request, including the custom audio message received from the user, to VM system 142 so as to enable the use of the user-provided custom audio.

In step 508, VM system 142 sends a reply message to VM proxy 140 that includes either an acknowledgement (e.g., "ACK") that the default message has been enabled successfully, as requested in step 507, or a failure notification (e.g., a "HACK") due to a system error (e.g., the MDN or voicemail account of the subscriber is not active). VM proxy 140 then sends to e-mail client 125 either an acknowledgement or failure notification in step 509 in reply to the initial request from e-mail client 125 in step 502.

Figure 6:
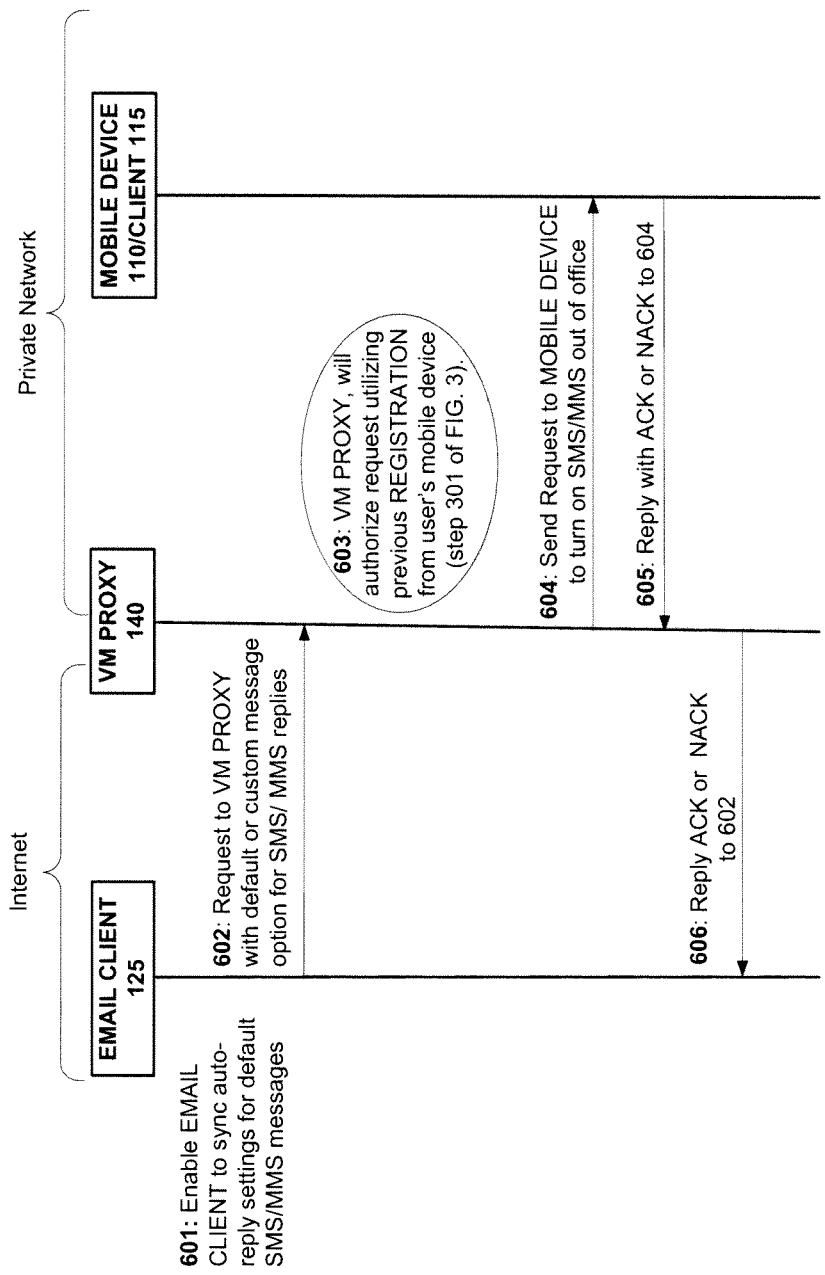
FIG. 6 is a flowchart of an exemplary process for synchronizing default automated reply settings for e-mail and other mobile message communication services.

FIG. 6 is a flowchart of an exemplary process 600 for synchronizing default automated reply settings for e-mail and other mobile messaging communication services. By way of example, process 600 will be described using the component systems/devices of networking environment 100 of FIG. 1, as described above. Thus, process 600 will be described using mobile device 110 (or client 115), e-mail client 125 and VM proxy 140 of FIG. 1, as described above. However, it should be noted that process 600 is not intended to be limited thereto and that process 600 may be used with devices and systems of different networking environments. Also, by way of example, process 600 will be described with respect to process 300 of FIG. 3, as described above, but process 600 is not intended to be limited thereto.

In the example shown in FIG. 6, VM proxy 140 serves as an interface for communications between e-mail client 125 and client 115. Process 600 begins at step 601, in which the user configures e-mail client 125 to synchronize default message reply settings for SMS/MMS messages when an automated reply feature (e.g., "out-of-office assistant") of e-mail client 125 is enabled. As described above, these settings may be configured by the user via the interface of e-mail client 125.

Also, as described above, the user may use the interface of e-mail client 125 to configure settings to be applied with respect to an automated message (e.g., including text and/or image content) sent in response to inbound SMS or MMS messages directed to the MDN associated with mobile device 110. The SMS/MMS messages may be sent by other mobile device users. While not shown in FIG. 6, such messages may be routed by a message server or router of the wireless carrier or operator of a mobile communications network (e.g., network 130 of FIG. 1, as described above) through the carrier's private internal network to mobile device 110. In this example, the application of out-of-office settings configured for both received emails (e.g., at e-mail server 160) and inbound SMS/MMS messages may be enabled simultaneously when the user enables an out-of-office setting using e-mail client 125.

In step 602, e-mail client 125 sends a request specifying a default or custom SMS/MMS message option to VM proxy 140, e.g., depending on the auto-reply settings configured by the user at e-mail client 125. In addition to an indication of the type of message option, the request from e-mail client 125 includes authentication information, for example, the authentication key or secret hash password registered previously for the user's mobile device (e.g., from client 115 of mobile device 110 in step 301 of process 300 of FIG. 3, as described above). As noted previously, the registered authentication key or password is stored in association with the MDN of the mobile device in, for example, a local data store accessible to e-mail client 125. The hash password in this example was received previously from the device. In a different example, the hash password is provided by the user via an interface of e-mail client 125 (e.g., via plug-in preference panel 200 of FIG. 2, as described above). In some implementations, for increased security, VM proxy 140 may require additional account authorization information (e.g., username and password information for the user's e-mail and voicemail accounts) from e-mail client 125. The account authorization information received from e-mail client 125 is compared with previously registered information stored in association with the MDN of the mobile device.

In step 603, VM proxy 140 authorizes the request by comparing the information received in the request from e-mail client 125 with information stored previously for the user's mobile device (e.g., as previously received from mobile device 110 in step 301 of process 300 of FIG. 3, as described above). In step 604, VM proxy 140 sends a request to enable automated SMS/MMS out-of-office replies to mobile device 110 (e.g., via client 115). In step 605, mobile device 110 sends a reply message to VM proxy 140 that includes either an acknowledgement (e.g., "ACK") that the default message has been enabled successfully, as requested in step 407, or a failure notification (e.g., a "NACK") due to a system error (e.g., the MDN or voicemail account of the subscriber is not active). Depending on the reply from mobile device 110 in step 604, VM proxy 140, in step 606, sends to e-mail client 125 either an acknowledgement or failure notification in reply to the initial request from e-mail client 125 in step 602.

Figure 7:
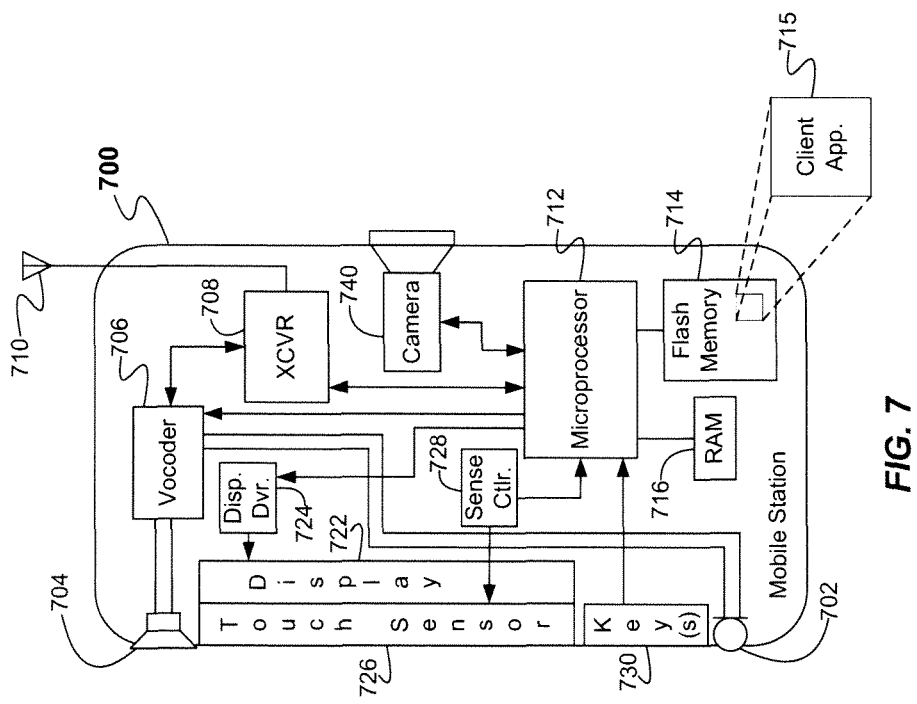
FIG. 7 is a high-level functional block diagram of an exemplary mobile device.

FIG. 7 is a high-level functional block diagram of an example mobile device 700 in which portions of the subject technology may be implemented. In the example of FIG. 7, mobile device 700 is in the form of a mobile handset including a touch-screen display. Examples of touch-screen type mobile devices that may be used to implement mobile device 700 may include, but are not limited to, a smart phone device or tablet computer. However, the structure and operation of the touch-screen type mobile device 700, as will be described in further detail below, is provided by way of example, and the subject technology as described herein is not intended to be limited thereto. It should be appreciated that the disclosed subject matter may be implemented using a non-touch screen type mobile or portable device having communication and data processing capabilities, including capabilities to receive and display caller-specific information including image data associated with the caller at the device. Examples of such mobile devices may include, but are not limited to, net-book computers, tablets, notebook computers and the like. For example, the relevant functional elements/aspects of mobile device 110 of FIGS. 1, 3 and 6, as described above, may be implemented using the example mobile device 700 illustrated in FIG. 7.

For purposes of discussion, FIG. 7 provides a block diagram illustration of an exemplary mobile device 700 having a touch-screen user interface. As such, mobile device 700 can be any smart mobile device (e.g., smart-phone or tablet device). Although possible configured somewhat differently, at least logically, a number of the elements of the exemplary touch-screen type mobile device 700 are similar to the elements of mobile device 700, and are identified by like reference numbers in FIG. 7. For example, the touch-screen type mobile device 700 includes a microphone 702, speaker 704 and vocoder 706, for audio input and output functions, much like in the earlier example. The mobile device 700 also includes at least one digital transceiver (XCVR) 708, for digital wireless communications, although the mobile device 700 may include an additional digital or analog transceiver. The concepts discussed here encompass embodiments of the mobile device 700 utilizing any digital transceivers that conform to current or future developed digital wireless communication standards. As in mobile device 700, the transceiver 708 provides two-way wireless communication of information, such as vocoded speech samples and/or digital information, in accordance with the technology of a network, as described above. The transceiver 708 also sends and receives a variety of signaling messages in support of the various voice and data services provided via the mobile device 700 and the communication network. Each transceiver 708 connects through RF send and receive amplifiers (not separately shown) to an antenna 710. The transceiver may also support various types of mobile messaging services, such as short message service (SMS), enhanced messaging service (EMS) and/or multimedia messaging service (MMS).

As in the example of mobile device 700, a microprocessor 712 serves as a programmable controller for the mobile device 700, in that it controls all operations of the mobile device 700 in accord with programming that it executes, for all general operations, and for operations involved in the procedure for registering mobile device identifier information (e.g., MDN) and generated hash password or security key for enabling synchronization of automated reply message settings, as described above. Mobile device 700 includes flash type program memory 714, for storage of various program routines and mobile configuration settings including, but not limited to, a client application 715 for implementing the functionality of the automated or out-of-office reply message synchronization functionality described herein. Client application 715 may be implemented using, for example, client 115 of FIG. 1, as described above. The mobile device 700 may also include a non-volatile random access memory (RAM) 716 for a working data processing memory. Of course, other storage devices or configurations may be added to or substituted for those in the example. Hence, as outlined above, the mobile device 700 includes a processor, and programming stored in the flash memory 714 configures the processor so that the mobile device is capable of performing various desired functions, including in this case the functions associated with client application 715 executing on the mobile device, involved in the techniques for providing message synchronization services by the carrier.

In the example shown in FIG. 7, the user input elements for mobile device 700 include a touch-screen display 722 (also referred to herein as "display screen 722" or simply, "display 722") and a keypad including one or more hardware keys 730. For example, the keypad may be implemented as a sliding keyboard of mobile device 700 and keys 730 may correspond to the keys of such a keyboard. Alternatively, the hardware keys 730 (including keyboard) of mobile device 700 may be replaced by soft keys presented in an appropriate arrangement on the touch-screen display 722. The soft keys presented on the touch-screen display 722 may operate similarly to hardware keys and thus, can be used to invoke the same user interface functions as with the hardware keys.

In general, the touch-screen display 722 of mobile device 700 is used to present information (e.g., text, video, graphics or other content) to the user of the mobile device. Touch-screen display 722 may be, for example and without limitation, a capacitive touch-screen display. In operation, touch-screen display 722 includes a touch/position sensor 726 for detecting the occurrence and relative location of user input with respect to the viewable area of the display screen. The user input may be an actual touch of the display device with the user's finger, stylus or similar type of peripheral device used for user input with a touch-screen. Use of such a touch-screen display as part of the user interface enables a user to interact directly with the information presented on the display.

Accordingly, microprocessor 712 controls display 722 via a display driver 724, to present visible outputs to the device user. The touch sensor 726 is relatively transparent, so that the user may view the information presented on the display 722. Mobile device 700 may also include a sense circuit 228 for sensing signals from elements of the touch/position sensor 726 and detects occurrence and position of each touch of the screen formed by the display 722 and sensor 726. The sense circuit 728 provides touch position information to the microprocessor 712, which can correlate that information to the information currently displayed via the display 722, to determine the nature of user input via the screen. The display 722 and touch sensor 726 (and possibly one or more keys 730, if included) are the physical elements providing the textual and graphical user interface for the mobile device 700. The microphone 702 and speaker 704 may be used as additional user interface elements, for audio input and output, including with respect to some functions related to the automated picture caller-ID feature for incoming voice calls, as described herein.

In the illustrated example of FIG. 7, the mobile device 700 also includes a digital camera 740, for capturing still images and/or video clips. Although digital camera 740 is shown as an integrated camera of mobile device 700, it should be noted that digital camera 740 may be implemented using an external camera device communicatively coupled to mobile device 700. The user may, for example, operate one or more keys 730 or provide input via touch sensor 726 (e.g., via a soft key displayed via the touch-screen display 722) to take a still image, which essentially activates the camera 740 to create a digital representation of an optical image visible to the image sensor through the lens of the camera. For example, the image may be of the subscriber or user associated with mobile device 700, as described previously. The camera 740 supplies the digital representation of the image to the microprocessor 712, which stores the representation as an image file in one of the device memories. The microprocessor 712 may also process the image file to generate a visible image output as a presentation to the user on the display 722, when the user takes the picture or at a later time when the user recalls the picture from device memory. Video images could be similarly processed and displayed. An audio file or the audio associated with a video clip could be decoded by the microprocessor 712 or the vocoder 706, for output to the user as an audible signal via the speaker 704.

As shown by the above discussion, some functions relating to synchronization of automated reply message settings for different messaging services may be implemented on a mobile device of a user, as shown by mobile device 110 of FIGS. 1, 3 and 6 and mobile device 700 of FIG. 7, as described above, whereas other functions of the disclosed methodologies may be implemented on computers configured as servers, as shown at 140-142, 150 and 160 of FIG. 1, as described above. It should be noted that user device functions are not limited to mobile device implementation and that such functions as well as server functions may be implemented using any general-purpose computing device including, for example and without limitation, a personal desktop computer or workstation device.

A general-purpose computer used for data processing and communications applications typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, as described herein. The software code is executable by the general-purpose computer. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for synchronization of automated reply message settings for different messaging services, in essentially the manner performed in the implementations discussed and illustrated herein.

Figure 8:
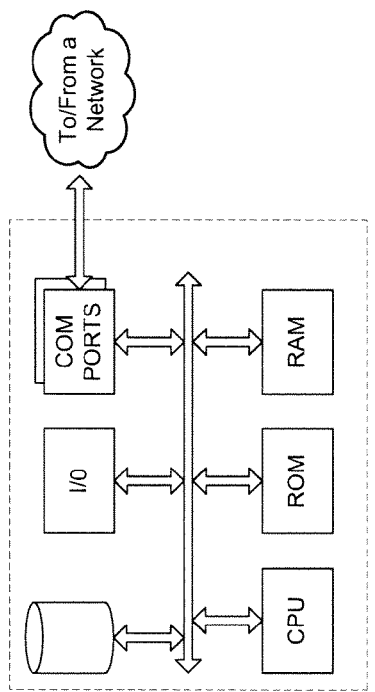
FIG. 8 is a simplified functional block diagram of an exemplary computer that may be configured to host a service, for example, to function as an application server in the system of FIG. 1.
Figure 9:
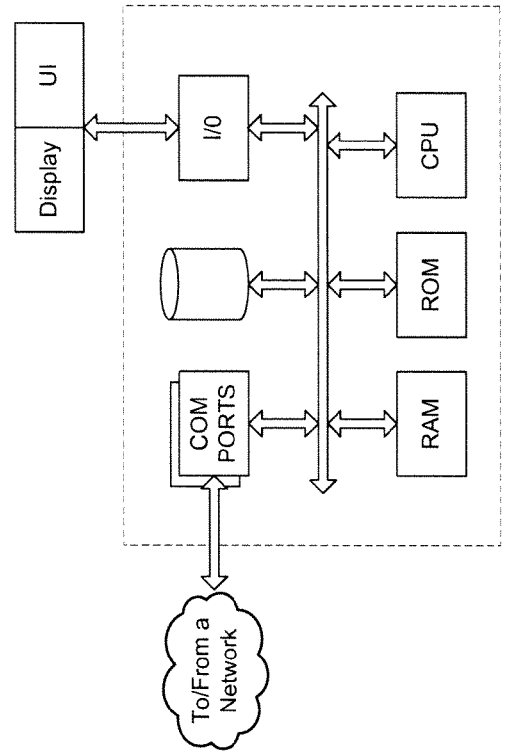
FIG. 9 is a simplified functional block diagram of an exemplary personal computer or other work station or terminal device.

FIGS. 8 and 9 provide functional block diagram illustrations of general purpose computer hardware platforms. FIG. 8 illustrates a network or host computer platform, as may typically be used to implement a server (e.g., VM proxy 140, registrar 141 and servers of VM systems 142 and 150 and e-mail server 160 of FIG. 1, as described above). FIG. 9 depicts a computer with user interface elements, as may be used to implement a workstation, desktop computing device or personal computer (e.g., computing device 120 of FIG. 1, as described above). It is believed that the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Hence, aspects of processes 300, 400, 500 and 600 of FIGS. 3-6, respectively, as described above, may be embodied in programming. Program aspects of the technology may be thought of as "products" or "articles of manufacture" typically in the form of executable code or process instructions and/or associated data that is stored on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a service provider into the computer platform of the application or server that will be hosting the service.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory" media such as tangible storage media, terms such as "computer" or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the appropriate steps of processes 300, 400, 500 and 600 of FIGS. 3-6, respectively. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As noted above, the computer as illustrated in the example of FIG. 9 may be used to implement a workstation, desktop or personal computer with user interface elements. For example, such a device may include a display for user input and output. It is believed that the structure, programming, and general operation of such computing equipment and as a result the drawing should be self-explanatory. As shown by the example of FIG. 9, the computer comprises a central processor or other processing device, an internal communication bus, various types of memory or storage media (RAM, ROM, EEPROM, cache memory, disk drives, etc.) for code and data storage, and one or more network interface cards or ports for communication purposes. Although not shown in FIG. 9, the computer can further comprise various wireless transceiver modules (or components) such as WiFi, IrDA, Bluetooth, etc. The software functionalities involve programming, including executable code, associated stored data, and graphical user interface code for implementing a client application program at the computer. The software code is executable by the processor of the computer. In operation, the code is stored within the computer or within a storage device integrated with or coupled to the computer. At other times, however, the software may be stored at other locations and/or transported for loading into the appropriate computer or storage device thereof. Execution of such code by a processor of the computer enables the computer to implement the methodology for a client (e.g., e-mail client 125 of FIGS. 1 and 3-6, as described above) for requesting access to one or more functions offered by a service, in essentially the manner performed in the implementation discussed and illustrated herein.

The service can be implemented in a remote computer (or server) on a network. In an example, a user device sends authentication information to the remote server for requesting access to a function of a service hosted at the server; and the remote server processes the request based on the authentication of the user device and returns an appropriate response to the user device over the network. In the example above, the user device operates as a client terminal and the remote computer as a server in a client-server network environment.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

registering, at a voicemail proxy server, user account information and an authentication key for a first messaging service associated with a mobile device of a user and a second messaging service associated with a client of the second messaging service, wherein:
  the first messaging service is a voicemail service provided by an operator of the mobile communication network associated with the user's mobile device;
  the second messaging service is an electronic mail service associated with a third-party service provider;
  the client is an electronic mail client associated with the electronic mail service of the third-party service provider;

in response to successfully registering the user account information and the authentication key for the first and second messaging services, receiving at the voicemail proxy server, an automated reply request message requesting access to an automated reply function of the first messaging service from the client of the second messaging service, the automated reply request message including authentication information for the first and second messaging services and further specifying configuration information for the automated reply function of the first messaging service;

after receiving the automated reply request message, determining at the voicemail proxy server, whether the client is authorized to access the automated reply function of the first messaging service based on a comparison of the authentication information in the automated reply request message received from the client with the authentication key registered for the mobile device;

when the client is determined to be authorized, determining at the voicemail proxy server, whether a voicemail system server of the first messaging service associated with the user's mobile device is known based on cached internet protocol address information available at the voicemail proxy server;

upon determining that the voicemail system server is unknown, sending from the voicemail proxy server to a registration server system in the mobile communication network, a network address request for a location of the voicemail system server;

in response to sending the network address request to the registration server system, receiving at the voicemail proxy server, a first internet protocol address associated with the voicemail system server and caching the first internet protocol address of the voicemail system server;

in response to receiving the first internet protocol address, subscribing at the voicemail proxy server, to the registration server system to receive updates to the cached first internet protocol address of the voicemail system server; and in response to receiving the first internet protocol address, sending from the voicemail proxy server, a voicemail service request to the voicemail system server of the first messaging service using the cached first internet protocol address so as to allow the client to access the automated reply function of the first messaging service in accordance with the configuration information specified in the automated reply request message from the client.

2. The method of claim 1, wherein the user account information and the authentication key are registered in response to a registration request received from the mobile device via a mobile communication network, the registration request from the mobile device including the user account information and the authentication key.

3. The method of claim 1, wherein:
the authentication key is generated by a client of the first messaging service executable at the mobile device;
the generated authentication key is sent by the client of the first messaging service to the client of the second messaging service; and
the authentication information in the access request message received from the client of the second messaging service includes the generated authentication key from the client of the first messaging service.

4. The method of claim 1, wherein the user account information includes a mobile device number identifying the user's mobile device for the voicemail service and an e-mail address associated with the user for the electronic mail service.

5. The method of claim 1, wherein the automated reply function of the voicemail service configures the voicemail system server to play an audio message, automatically, in response to an incoming voice call for the mobile device directed through the mobile communication network to the voicemail service.

6. The method of claim 5, wherein the configuration information specifies a default configuration option for the audio message to be played in response to the incoming voice call directed to the voicemail service.

7. The method of claim 5, wherein the configuration information includes a user-specified audio message to be played in response to the incoming call directed to the voicemail service.

8. An application server, comprising:
a network communication device configured to exchange data communications through a mobile communication network, the mobile communication network including at least one database accessible to the network communication device;
a processor coupled to the network communication device;
a storage device accessible to the processor; and
an application program in the storage device, the application program including a plurality of functions for a first messaging service and a second messaging service, wherein execution of the application program by the processor configures the application server to exchange data communications related to the plurality of functions with an associated mobile device of the first messaging service and an associated client of the second messaging service through the mobile communication network,
wherein the processor is configured to perform functions including:
registering, at a voicemail proxy server, user account information and an authentication key for the first messaging service associated with the mobile device and the second messaging service associated with a client of the second messaging service, wherein:
the first messaging service is a voicemail service provided by an operator of the mobile communication network associated with the user's mobile device;
the second messaging service is an electronic mail service associated with a third-party service provider;
the client is an electronic mail client associated with the electronic mail service of the third-party service provider;
in response to successfully registering the user account information and the authentication key for the first and second messaging services, receiving at the voicemail proxy server, an automated reply request message requesting access to an automated reply function of the first messaging service from the client of the second messaging service, the automated reply request message including authentication information for the first and second messaging services and further specifying configuration information for the automated reply function of the first messaging service;
after receiving the automated reply request message, determining at the voicemail proxy server, whether the client is authorized to access the automated reply function of the first messaging service based on a comparison of the authentication information in the automated reply request message received from the client with the authentication key stored for the mobile device;
when the client is determined to be authorized, determining at the voicemail proxy server, whether a voicemail system server of the first messaging service associated with the user's mobile device is known based on cached internet protocol address information available at the voicemail proxy server;
upon determining that the voicemail system server is unknown, sending from the voicemail proxy server to a registration server system in the mobile communication network, a network address request for a location of the voicemail system server;
in response to sending the network address request to the registration server system, receiving at the voicemail proxy server, a first internet protocol address associated with the voicemail system server and caching the first internet protocol address of the voicemail system server;

in response to receiving the first internet protocol address, subscribing at the voicemail proxy server, to the registration server system to receive updates to the cached first internet protocol address of the voicemail system server; and in response to receiving the first internet protocol address, sending from the voicemail proxy server, a voicemail service request to the voicemail system server of the first messaging service using the cached first internet protocol address so as to enable the client to access the automated reply function of the first messaging service in accordance with the configuration information specified in the automated reply request message from the client.

9. The application server of claim 8, wherein the user account information and the authentication key are registered in response to a request received from the mobile device via the mobile communication network, the request from the mobile device includes the user account information and the authentication key, and the user account information and the authentication key are stored in association with a mobile device identifier associated with the mobile device.

10. The application server of claim 8, wherein the sending function further includes:

upon determining the client of the second messaging service is authorized to access the automated reply function of the first messaging service, identifying a network location of the server of the first messaging service; and sending the request to the server of the first messaging service to enable the client to access the automated reply function of the first messaging service, based on the identified network location of the server.

11. The application server of claim 10, wherein the network location of the server of the first messaging service is stored in the storage device of the application server, and the identifying function includes:

retrieving the stored network location of the server of the first messaging service from the storage device, based on the mobile device identifier associated with the mobile device.

12. The application server of claim 10, wherein the identifying function includes:

requesting the network location of the server of the first messaging service from a registration server in the mobile communication network.

13. The method of claim 1, further comprising:

in response to subscribing to the registration server system to receive updates to the cached first internet protocol address of the voicemail system server, receiving at the voicemail proxy server, updates from the registration server system to the cached first internet protocol address of the voicemail system server.

14. The method of claim 13, further comprising:

in response to sending the request to the voicemail system server of the first messaging service using the cached first internet protocol address, receiving at the voicemail proxy server a reply message from the voicemail system server that includes an acknowledgement that the automated reply function has been enabled.

15. The method of claim 14, further comprising:

after receiving the acknowledgment from the voicemail system server at the voicemail proxy server, sending to the client an acknowledgment in reply to the automated reply request message requesting access to an automated reply function.

16. The application server of claim 8, wherein the processor is configured to perform further functions including:

in response to subscribing to the registration server system to receive updates to the cached first internet protocol address of the voicemail system server, receiving at the voicemail proxy server, updates from the registration server system to the cached first internet protocol address of the voicemail system server.

17. The application server of claim 16, wherein the processor is configured to perform further functions including:

in response to sending the request to the voicemail system server of the first messaging service using the cached first internet protocol address, receiving at the voicemail proxy server a reply message from the voicemail system server that includes an acknowledgement that the automated reply function has been enabled.

18. The application server of claim 17, wherein the processor is configured to perform further functions including:

after receiving the acknowledgment from the voicemail system server at the voicemail proxy server, sending to the client an acknowledgment in reply to the automated reply request message requesting access to an automated reply function.

* * * * *